Aug. 11, 1970   D. L. HERMAN   3,523,726
XEROGRAPHIC COPYING DEVICE
Filed March 20, 1968   3 Sheets-Sheet 2

Aug. 11, 1970   D. L. HERMAN   3,523,726
XEROGRAPHIC COPYING DEVICE

Filed March 20, 1968   3 Sheets-Sheet 3

United States Patent Office 3,523,726
Patented Aug. 11, 1970

3,523,726
XEROGRAPHIC COPYING DEVICE
David L. Herman, 63 Catherine Road,
Scarsdale, N.Y. 10583
Filed Mar. 20, 1968, Ser. No. 719,291
Int. Cl. G03g 13/10
U.S. Cl. 355—10                                       3 Claims

ABSTRACT OF THE DISCLOSURE

A xerographic type copying device which supports planar material to be copied, a slidable carriage beneath the surface of the material to be copied for incrementally exposing portions of the surface to reflect the same upon a sheet of sensitized material located, beneath the carriage. Sensitized material is fed from a roll in accordance with preselected increments, the increments being severed when the carriage commences movement in a first direction to expose the increment, and transported to activating unit during the period in which the carriage is returning to its initial position. The activating unit has several chambers formed by septums placed within a tank containing an activating fluid. A mechanism is provided for directing successive segments of exposed sensitized material to different chambers in order that several exposed segments or sheets may be simultaneously activated while the device is in operation.

---

This invention relates generally to the field of xerographic copying devices of a type using metallic oxide coated papers which are first electrostatically charged, exposed to an image, and subsequently activated using a liquid toner which usually contains finely divided carbon particles in a volatile solvent. Devices of this type are well known in the art, being usually referred to as Electrofax type machines, and the invention lies in specific constructional improvements permitting increased speed of operation, and increased economy of operation based upon the saving of unused paper.

It is among the principal objects of the present invention to provide an activating unit which may simultaneously operate on successive segments or sheets of sensitized paper following exposure, so that the waiting period between successive exposures may be considerably shortened.

Another object of the invention lies in the provision of a device of the class described utilizing a reciprocating carriage for exposure of the sensitized material, in which successive segments of sensitized materials are advanced after exposure, and during the period in which the carriage is returning to a homing position.

A further object of the invention lies in the provision of an improved device of the class described in which the required length of paper for any given exposure may be preselected in accordance with the length of the material to be copied.

A further object of the invention lies in the provision of an improved xerographic type copying device in which the cost of fabrication thereof may be of a reasonably low order, with consequent wide sale, distribution and use.

A further object of the invention lies in the provision of an improved xerographic copying device employing sensitized material in roll form in which each succeeding segment of exposed sensitive material is severed from the roll prior to exposure thereof, so that it may be immediately transported to an activating station while a reciprocating carriage which has exposed the segment is returning to home position.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
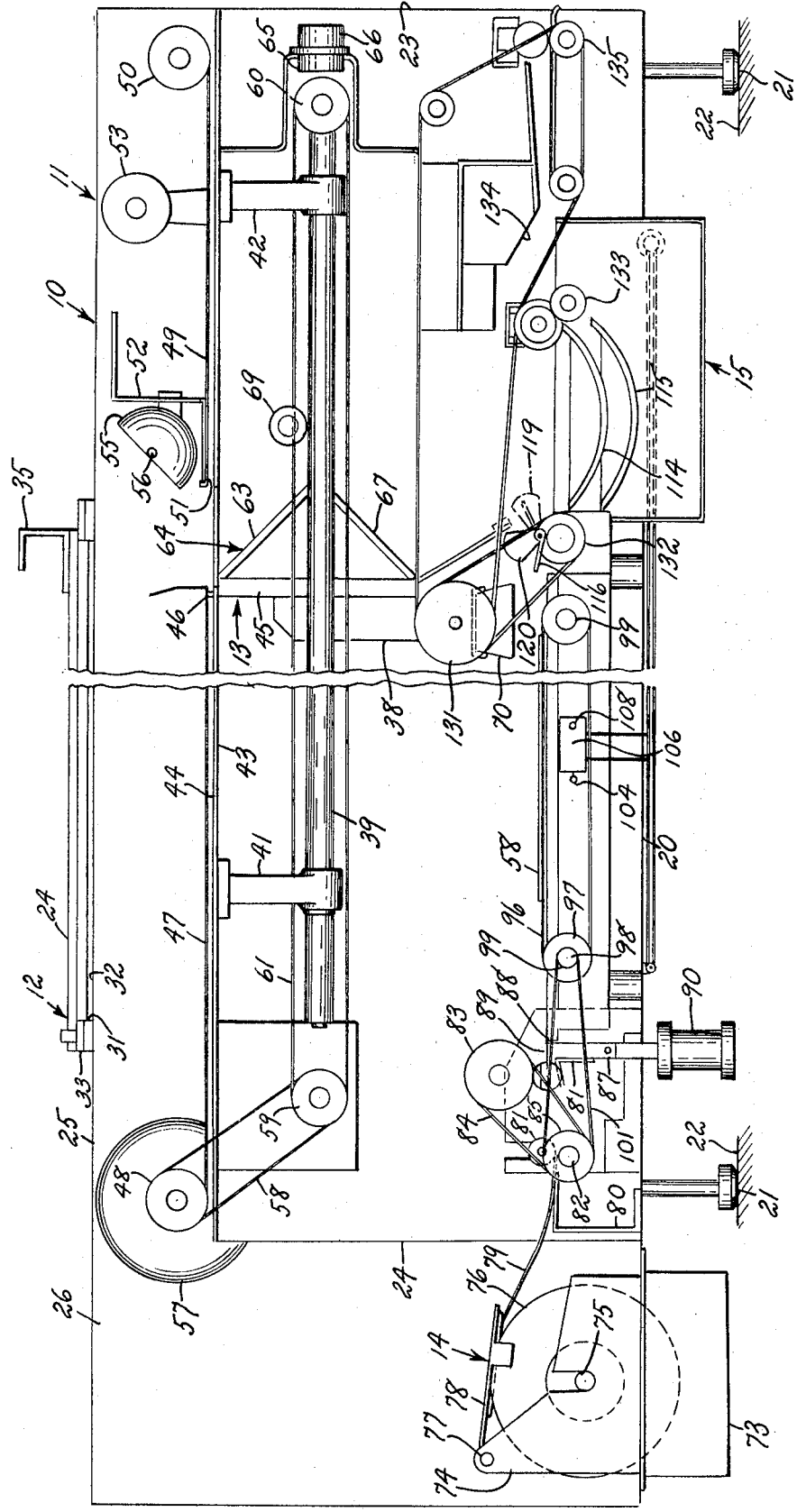
FIG. 1 is a schematic vertical sectional view of an embodiment of the invention.

In accordance with the invention, the device, generally indicated by reference character 10, comprises broadly: A frame and casing element 11, original copy retaining means 12, exposure means 13, copy paper supply means 14, copy paper activating means 15, and electrical circuitry 16.

The frame and casing element 11 may be manufactured in accordance with conventional practices, and includes a bottom wall 20 having support legs 21 for supporting the device 10 upon a horizontal surface 22, a front wall 23, a rear wall 24, an upper wall 25, and side walls, one of which is indicated by reference character 26.

Figure 2:
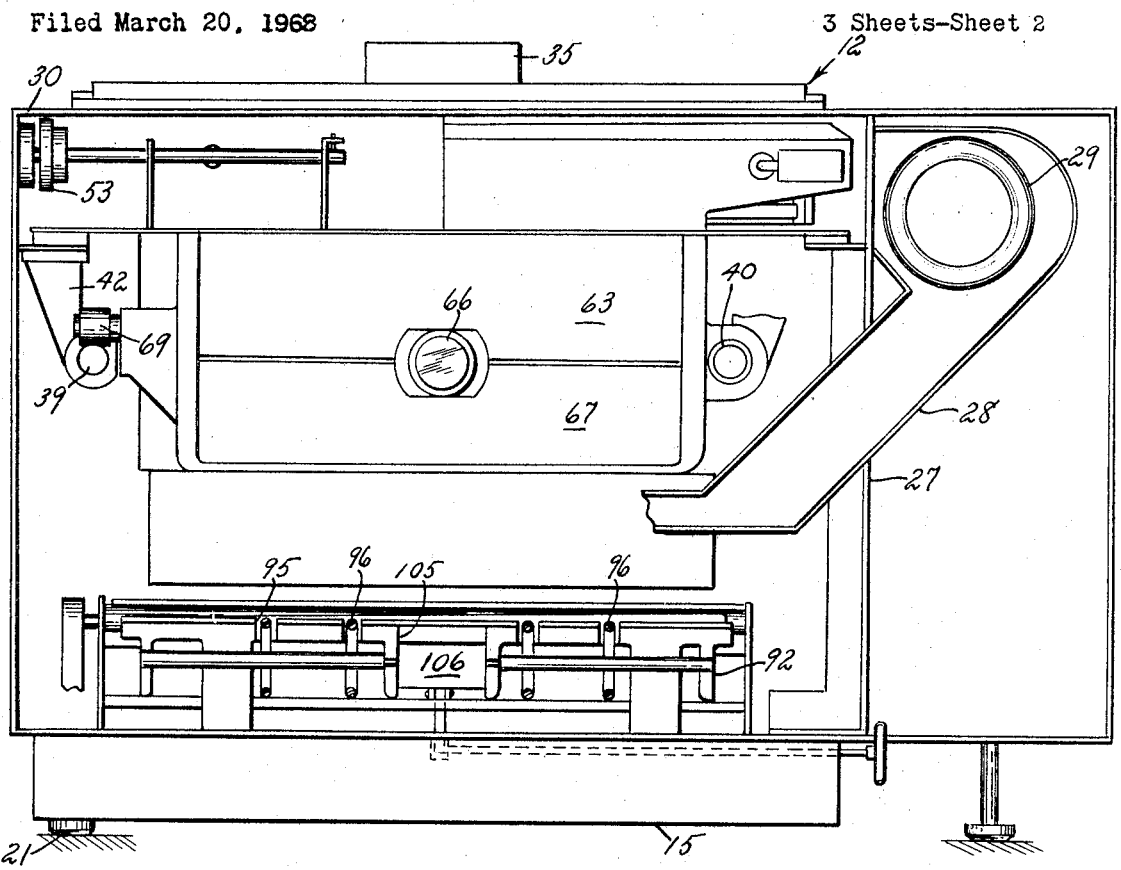
FIG. 2 is a schematic transverse sectional view thereof.

As best seen in FIG. 2, a septum 27 forms an air conduit 28 within the element 11 and encloses a blower 29 which serves to transfer heat from the illumination means to a point within the element 11 wherein it may be employed to assist in the evaporation of a volatile solvent remaining upon activated copy paper, as the same exits from the device.

The original copy retaining means 12 is mounted on the upper surface 30 of the upper wall 25 surrounding an opening 31 which mounts a glass plate 32. A frame 33 is disposed above the plate 32, and mounts a flexible pressure platen 34 of well known type, which may be moved upwardly by a handle 35 to permit the introduction and removal of original copy (not shown).

The exposure means 13 includes a reciprocating carriage element 38 supported for horizontal movement on rods 39 and 40, the rods being positioned by forward and rearward supports 41 and 42, respectively. The supports 41–42 are mounted on the under surface 43 of a horizontally positioned septum 44.

The carriage element 38 includes a vertically oriented plate 45, engaging one end 46 of a first light shielding curtain 47, the opposite end of which (not shown) is engaged with a transversely extending spring loaded spool 48. A second curtain 49 is similarly mounted on a second spring loaded spool 50, and the free end 51 thereof is attached to a bracket 52 on the carriage element. A manually adjustable wheel 53 determines the effective width of an aperture 54 between the curtains 47 and 49 in well known manner.

Mounted on the upper surface of the second curtain 49 is a reflector 55, the reflector in turn supporting a transversely oriented quartz iodine lamp 56 which illuminates the under surface of the original copy. A motor 57 operates a chain drive 58 suspended between sprockets 59 and 60, and a pair of chains, one of which is indicated by reference character 61 extends the length of the path of travel of the carriage to transmit the motion of the motor 57 thereto.

Mounted on the vertical plate 45 is an upper angularly disposed mirror 63 which receives light rays 64 reflected from the original copy, to a lens 65. Passing through the lens 65, the rays strike a vertically oriented mirror 66, from which they are reflected back through the lens to a lower mirror 67, and then upon the upper surface 58 of a segment or sheet of paper disposed in position for exposure. A separate air blower 69 communicates with an air conduit 70 to provide a current of air for maintaining the copy paper in planar position, so as to lie in the focal plane of the lens 65.

The copy paper supply means 14 includes an auxiliary housing 73 forming bracket means 74 supporting a paper supply spindle 75. The spindle 75 in turn supports a roll 76 of sensitized material. An upper transverse shaft 77 mounts drag or brake means 78, which in turn rests upon a paper web 79 emanating from the roll 76. The web 79 passes over a guide 80 for entry between upper and lower web advancement rollers 81 and 82 which are powered by motor means 83 through a chain drive 84 and sprocket 85. A second guide 86 is positioned adjacent a knife element 87 including a stationary edge 88 and a movable blade 89 powered by a selectively operated solenoid 90. The severed segment of paper rests upon a paper supporting platform 91, the details of which are best seen in FIG. 3.

Figure 3:
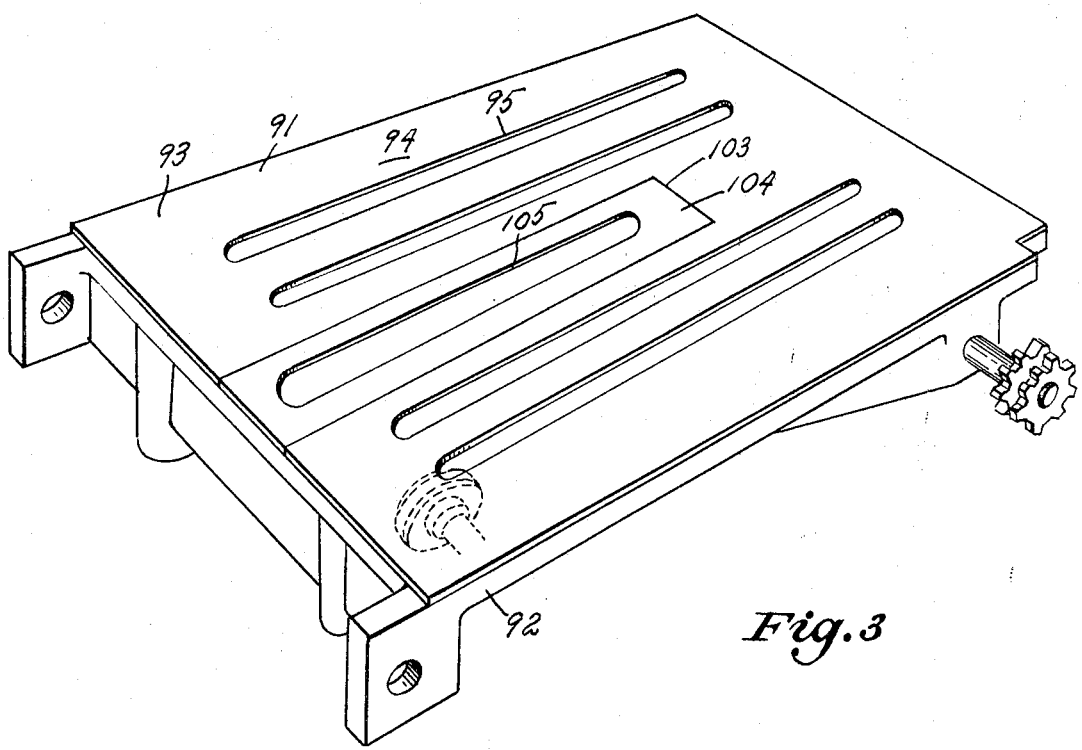
FIG. 3 is an enlarged view in perspective showing paper transport means comprising a part of the disclosed embodiment.

Referring to FIG. 3, the platform 91 is mounted on a sub-frame 92 by screw means 93, in such manner that the upper surface 94 thereof is disposed in the focal plane of the lens 65. The platform 91 includes four elongated slots 95, which accommodate paper transport belts 96 supported by pulleys 97 on shafts 98 and 99. The shaft 98 is driven through a sprocket 99 and sprocket chain 101 from the paper advancement means, as best seen in FIG. 1. A centrally disposed rectangular opening 103 mounts a plate 104 having an elongated slot 105 therein, beneath which is disposed a slidably mounted photocell 106 having an associated directional light source 107. Manually operated means 108 projecting outwardly of the casing and frame element 11 positions the photocell 106 in accordance with the desired length of sensitized paper to be used for a given exposure, as will more clearly appear hereinafter.

Figure 5:
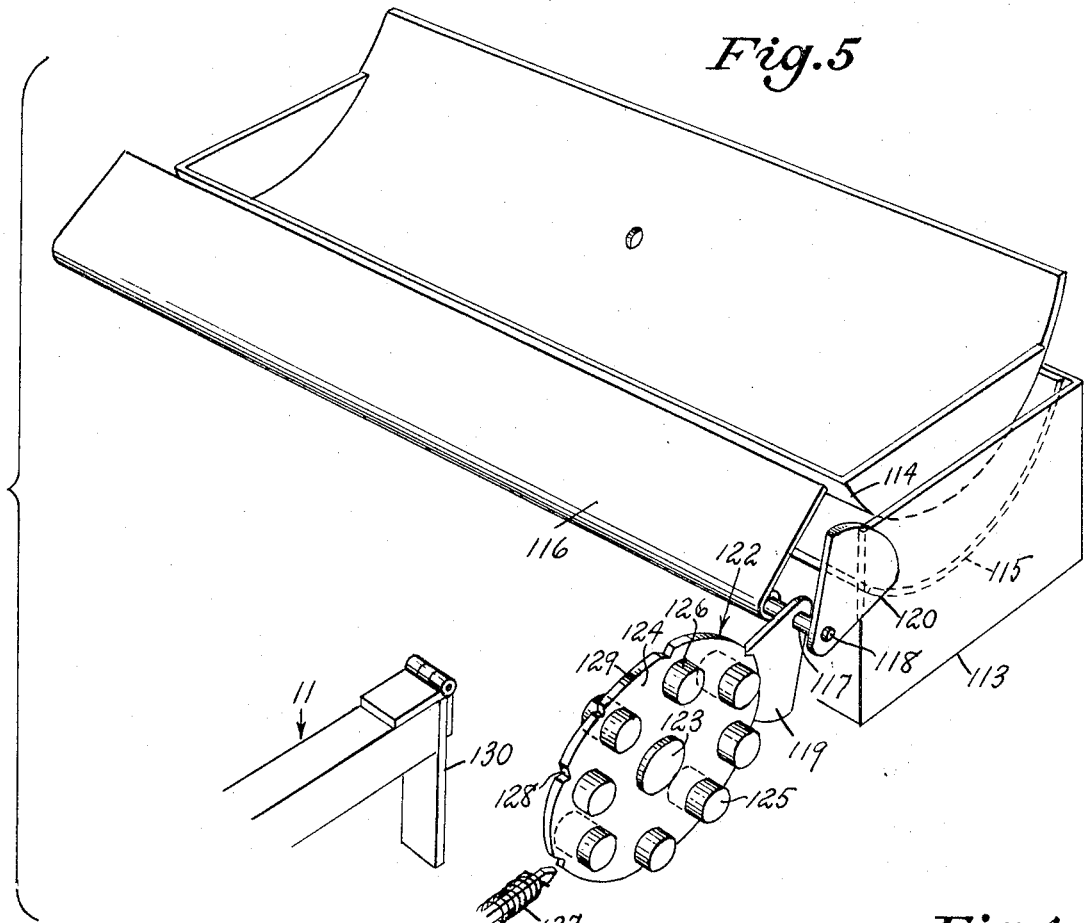
FIG. 5 is an enlarged fragmentary view in perspective showing activating means comprising a part of the disclosed embodiment.

Referring to FIG. 5 in the drawings, the copy paper activating means 15 includes means for immersing exposed paper in a liquid activator of well known type, normally including a suspension of carbon particles in a volatile organic solvent. In prior art devices, the activating means has, for all practical purposes, determined the effective output of the copier since it is the slowest acting unit in a line operation which includes the advancement of paper to a position for exposure the actual exposure, and the subsequent transport of the paper to the activating unit. Thus, in prior art devices the exposure and transport means are often required to be in inactive state while a previously exposed piece of sensitized material is being activated. The present invention contemplates the simultaneous activation of several pieces of exposed sensitized material, so that when multiple copies are made in rapid succession, the activator is in condition to accept exposed material as fast as it is produced.

Referring to FIG. 5, the means 15 includes a rectangular tank 113 mounting upper and lower trays 114 and 115, respectively, which cooperate with a pivotally mounted guide 116 supported by a transversely extending shaft 117. An end 118 of the shaft supports a pair of cam members 119 and 120 which are alternately contacted by a cam actuating means 122 mounted on the carriage element 38. The means 122 is mounted on a pintle 123, and includes a circular plate 124 having first and second sets of projections 125 and 126 which are alternately positioned with each carriage element reciprocation. Spring loaded detent means 127 cooperates with notches 128 in the periphery 129 of the member 124. A stationary member 130 mounted on the element 11 causes incremental rotation to position successive projections 125 or 126 in line with the corresponding cams to move the guide 16 to a position where it is aligned with either the upper tray 114 or the lower tray 115.

A continuously rotating motor 131 operates a first set of rollers 132 serving to move individual sheets or segments of exposed material into either the upper or lower portions of the tank 113. The same motor drives a second set of squeegee rollers 133 which conduct the now activated sheets to an exit chute 134, at which point they are engaged by a third set of exit rollers 135 which move the finished sheets outwardly of the device. In this position, the sheets are exposed to hot air from the blower 29, which evaporates remaining vehicle remaining on the surfaces of the sheets.

Figure 4:
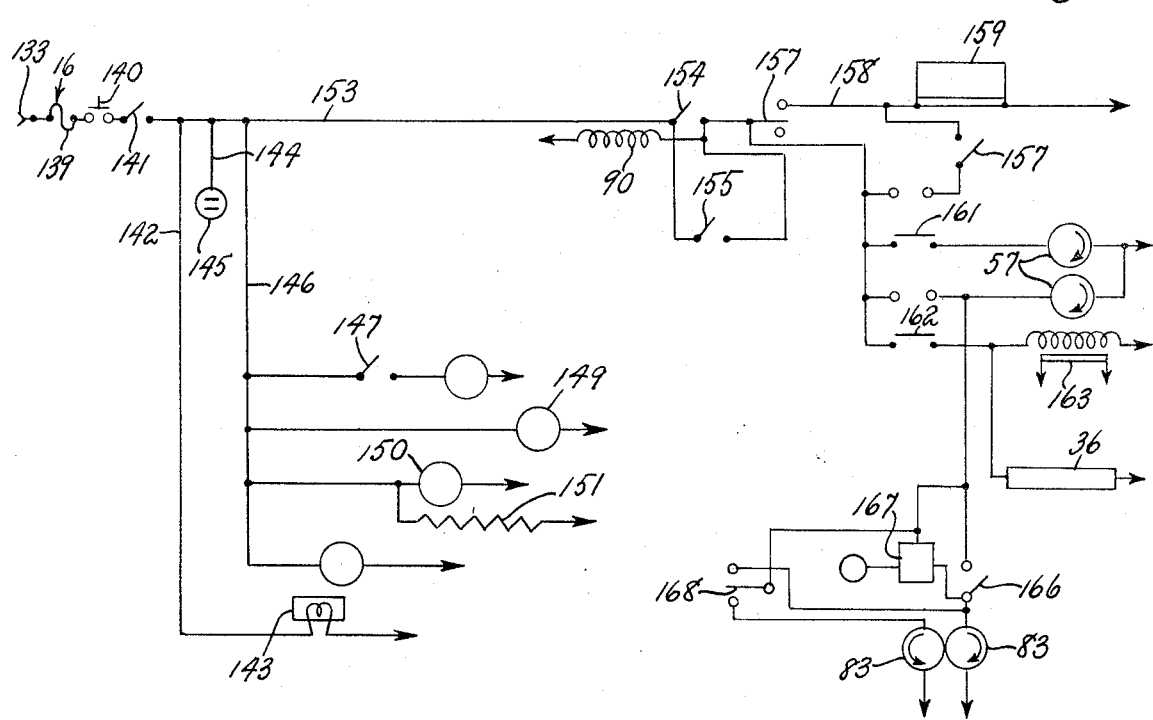
FIG. 4 is an electrical schematic wiring diagram.

Referring to FIG. 4, there is illustrated the electrical circuitry by means of which the various elements are operated. A power source 133 supplies 110 volt alternating current through a fuse 139 and an interlock switch 140 to a master switch 141, which when closed continuously powers the paper actuating means. Current also flows through a conductor 142 to a turbidity indicator 143 of well known type which serves to advise the user when additional activating materials are needed. A conductor 144 services a neon pilot light 145. A conductor 146 conducts current to a paper feed switch 147 which is automatically closed during operation as more fully described hereinbelow. The pump motor 149, which circulates fluid within the tank 113 runs continuously when the master switch 141 is closed. This is also true of the blower motor 150 and heater 151, which is optionally installed where insufficient heat is generated by the lamp 56.

A conductor 153 carries current to the print switch 154 which is of a momentary contact type and cooperates with an interlock switch 155. The switch 154 also operates the paper knife solenoid 90.

The carriage reversing switch 157 is actuated by contact of the carriage therewith at the completion of its leftward or exposing movement, and opening of the switch, which is normally closed interrupts current through the conductor 158 to the relay 159, thus changing the position of two double pole, double throw switches 161 and 162. This movement extinguishes the corona 163 and lamp 56, and connects current through a second coil in the carriage motor 57 to reverse the direction of the carriage and return it to homing position which is the rightwardmost position as seen in FIG. 1 in the drawing.

The paper position switch 166 cooperates with the paper feed switch, and is relay operated in conjunction with the photocell 106, so that paper will be advanced by the paper feed motor upon completion of the leftward movement of the carriage when the paper feed switch is closed, the movement being continued by a relay 167, the relay circuit being opened by completion of the photocell circuit, which then stops the paper feed motor at the desired position. Manual switch means 168 may be used to reverse the direction of the paper feed motor, in the event that excess paper is already positioned on the plate 104.

Upon reaching homing position, the switch 160 is opened by contact of the carriage therewith, at which point current to the carriage motor is interrupted, and the device awaits reactuation by closing the print switch.

I wish it to be understood that I do not consider the invention limited to the precise details of structure shown and set forth in this specification, for obvious modifications will occur to those skilled in the art to which the invention pertains.

I claim:

1. In a copying device including means for exposing a sheet of photosensitive material, means for transporting said material to an activating station, and an activating station including a container holding an activating fluid, the improvement comprising: means forming a plurality of paths through said container, and means for selectively directing successive sheets of photosensitive material through different paths in said container.

2. Structure in accordance with claim 1, said copying device including a reciprocating carriage element to expose successive sheets, and means on said carriage indexed with each reciprocation thereof for selecting a given path.

3. Structure in accordance with claim 2, said last mentioned means including an indexing rotary member, and a plurality of cams selectively positioned by said rotary member.

References Cited

UNITED STATES PATENTS 428,080   5/1890   Edwards _____ 95—89 XR 3,054,340   9/1962   Limberger.
3,441,345   4/1969   Kolibas _____ 355—70

FOREIGN PATENTS 378,159   7/1964   Switzerland.

NORTON ANSHER, Primary Examiner

R. P. GREINER, Assistant Examiner

U.S. Cl. X.R.

95—89; 355—27